United States Patent

Tseka et al.

[11] Patent Number: 5,792,975
[45] Date of Patent: Aug. 11, 1998

[54] CONNECTOR BLOCK HAVING DETONATOR-POSITIONING LOCKING MEANS

[75] Inventors: Thomas C. Tseka, West Suffield; James E. Fritz, Ellington; Daniel P. Sutula, Jr., Farmington, all of Conn.

[73] Assignee: The Ensign-Bickford Company, Simsbury, Conn.

[21] Appl. No.: 548,590

[22] Filed: Oct. 26, 1995

Related U.S. Application Data

[63] Continuation-in-part of Ser. No. 249,522, May 26, 1994, Pat. No. 5,499,581.

[51] Int. Cl.$^6$ .................. C06C 5/04; C06C 5/06
[52] U.S. Cl. .................. 102/275.7; 102/275.11; 102/275.12
[58] Field of Search .............. 102/275.3, 275.4, 102/275.7, 275.11, 275.12

[56] References Cited

U.S. PATENT DOCUMENTS

| | | | |
|---|---|---|---|
| 3,205,818 | 8/1963 | Coulson | 108/275.7 |
| 3,349,706 | 7/1966 | Schaumann | 102/275.7 |
| 3,889,703 | 6/1975 | Keathley | 137/67 |
| 3,987,732 | 10/1976 | Spraggs et al. | 102/275.3 |
| 4,137,930 | 2/1979 | Scholle | 137/614.03 |
| 4,239,003 | 12/1980 | Savitt | 102/275.5 |
| 4,248,152 | 2/1981 | Yunan | 102/275.4 |
| 4,424,747 | 1/1984 | Yunan | 102/275.2 |
| 4,714,017 | 12/1987 | Kelly et al. | 102/275.3 |
| 4,714,018 | 12/1987 | Lofgren | 102/275.7 |
| 4,722,279 | 2/1988 | Yunan | 102/275.4 |
| 4,815,382 | 3/1989 | Yuan | 102/275.7 |
| 4,889,299 | 12/1989 | Sarton et al. | 248/72 |
| 5,171,935 | 12/1992 | Michna et al. | 102/275.7 |
| 5,204,492 | 4/1993 | Jacob et al. | 102/275.7 |
| 5,398,611 | 3/1995 | Michna et al. | 102/275.7 |
| 5,423,263 | 6/1995 | Rontey et al. | 102/275.12 |
| 5,499,581 | 3/1996 | Sutula, Jr. | 102/275.12 |
| 5,524,547 | 6/1996 | Kelly et al. | 102/275.7 |

FOREIGN PATENT DOCUMENTS

| | | | |
|---|---|---|---|
| 1203121 | 4/1986 | Canada | 102/275.12 |
| 0500512 | 8/1992 | European Pat. Off. | 102/275.12 |
| 2684752 | 6/1993 | France | 102/275.7 |

*Primary Examiner*—Charles T. Jordan
*Assistant Examiner*—Theresa M. Wesson
*Attorney, Agent, or Firm*—Law OFfice of Victor E. Libert; Victor E. Libert

[57] ABSTRACT

A connector block (10) for connecting signal transmission lines in a blast initiation system includes a body member (12) having a channel (18) formed therein for receiving and retaining a detonator (20). A locking member (28) is mounted on the body member (12) in a first position aligned with, but displaced from, its locking position. The detonator (20) is inserted into the channel (18) of the connector block (10) and, if axially misaligned, is properly seated therein by moving the locking member (28) through a passageway (36) to both axially shift the detonator (20) to its seated position and engage the locking member (28) and the detonator with each other to secure both within the channel (18). A method of assembling a detonator (20) within the connector block (10) to provide a combination of detonator (20) and connector block (10) is also provided.

33 Claims, 6 Drawing Sheets

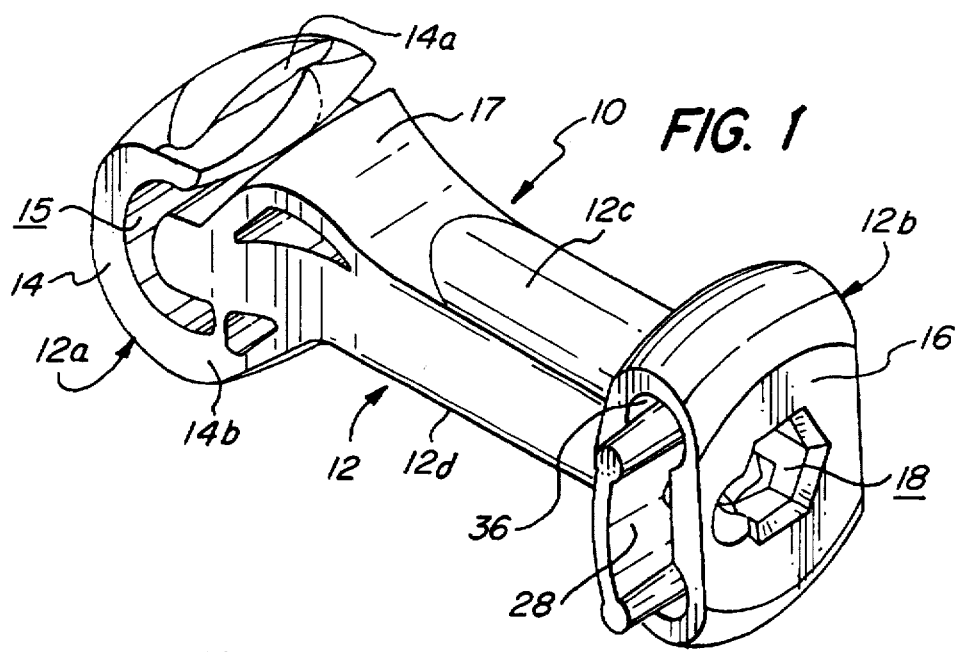
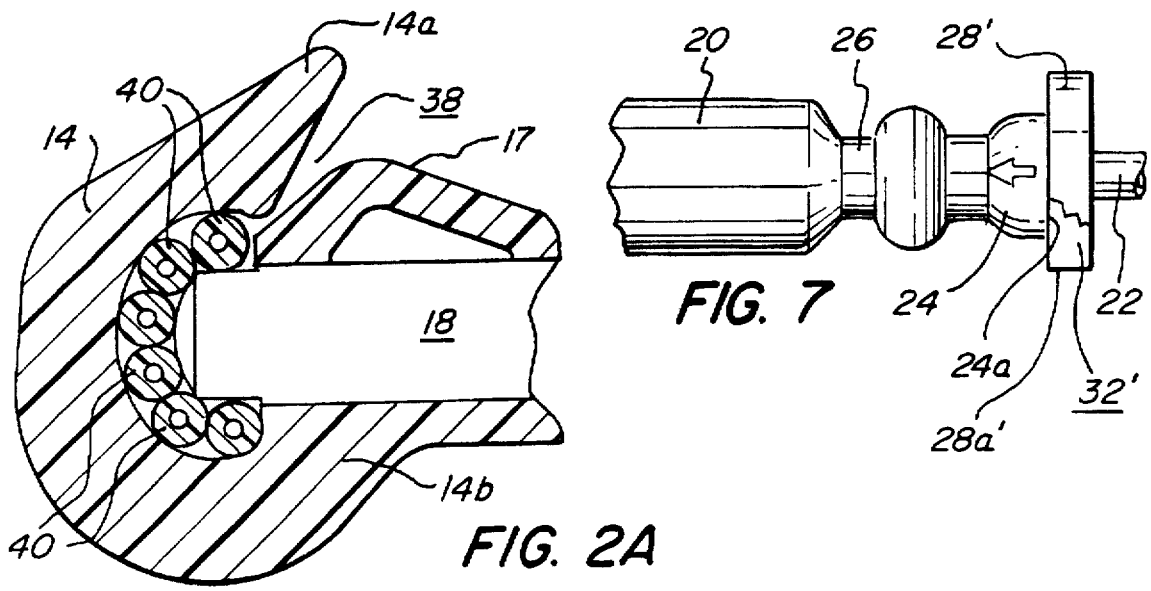

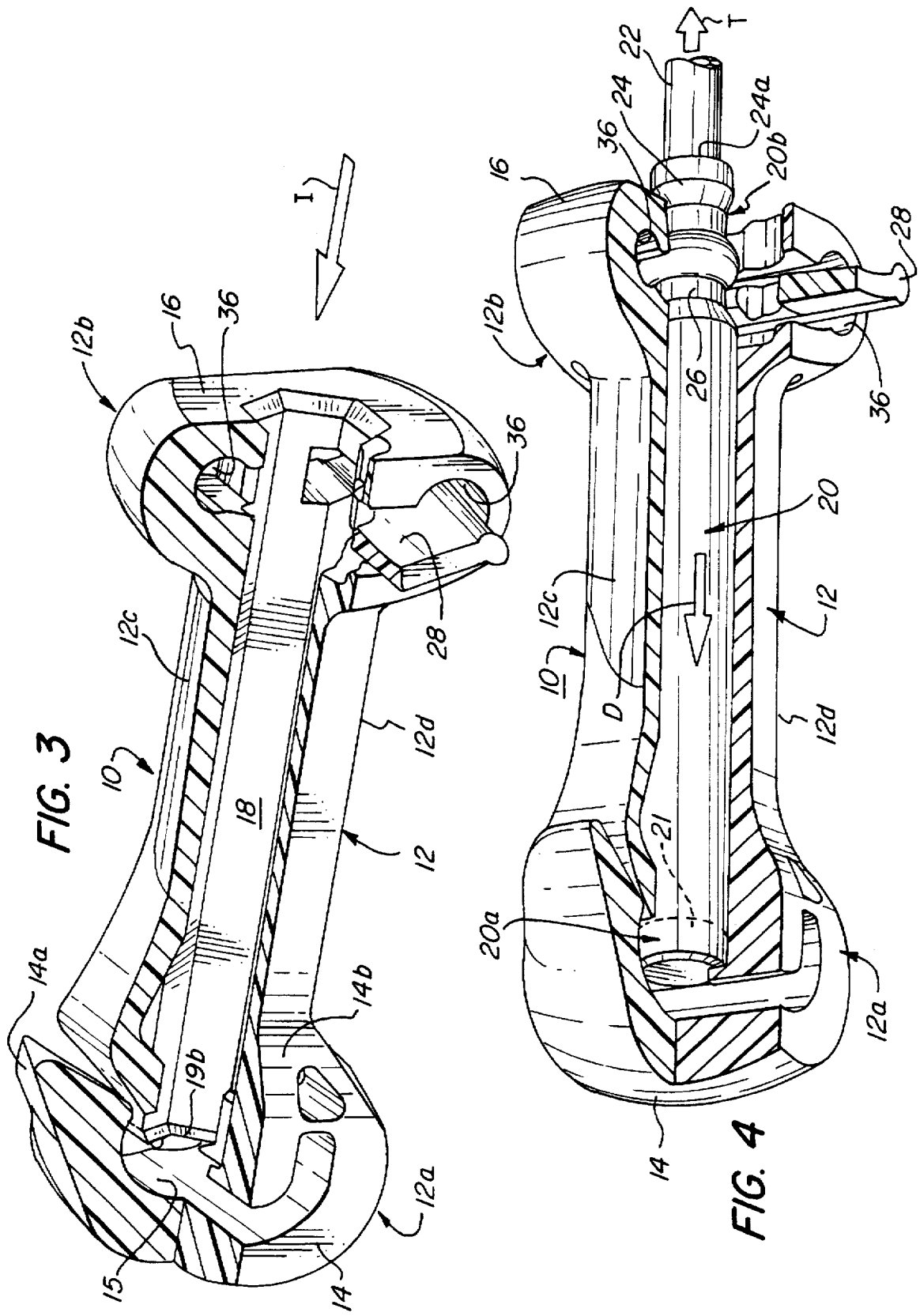

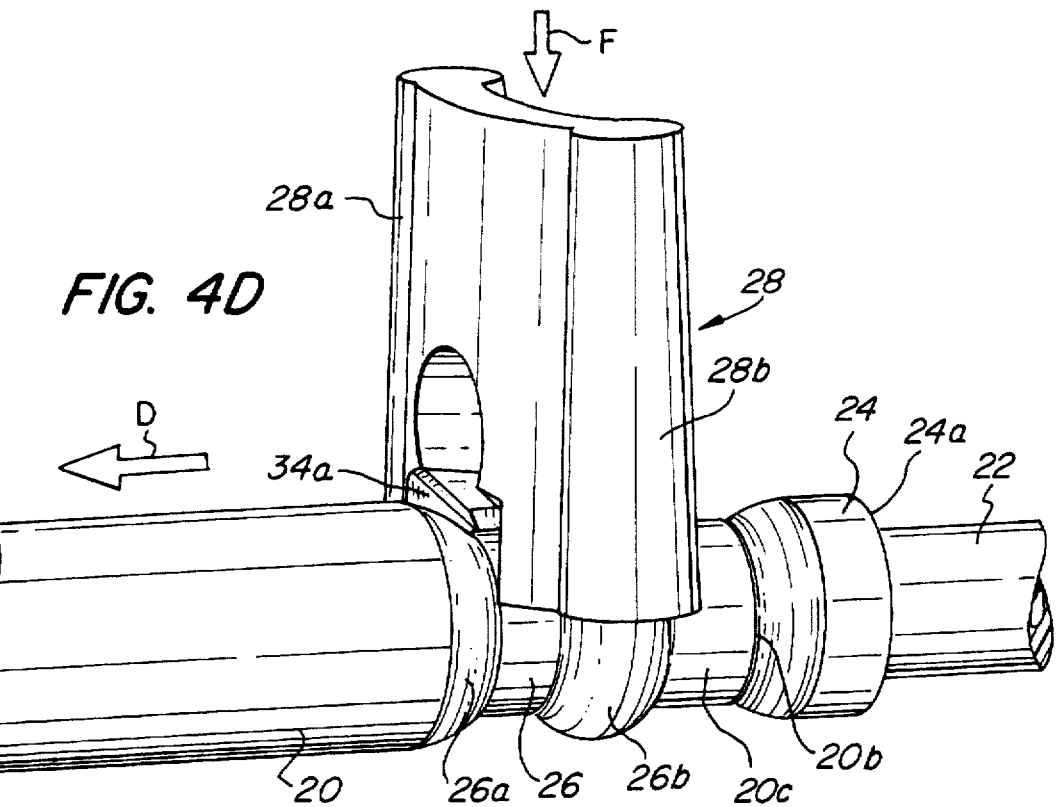
FIG. 4D
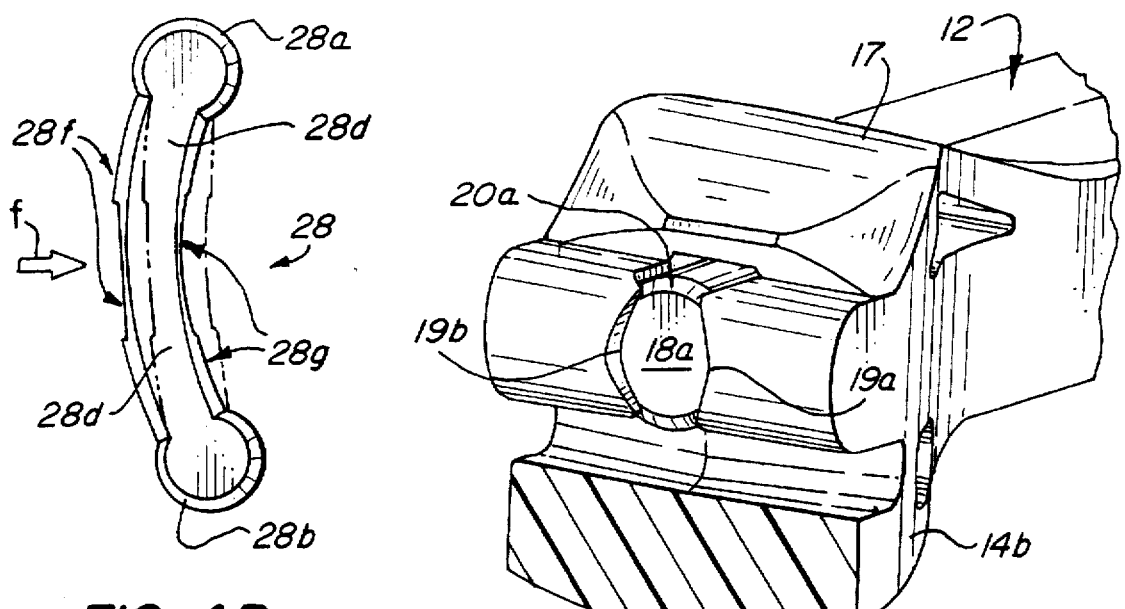
FIG. 4B
FIG. 4C

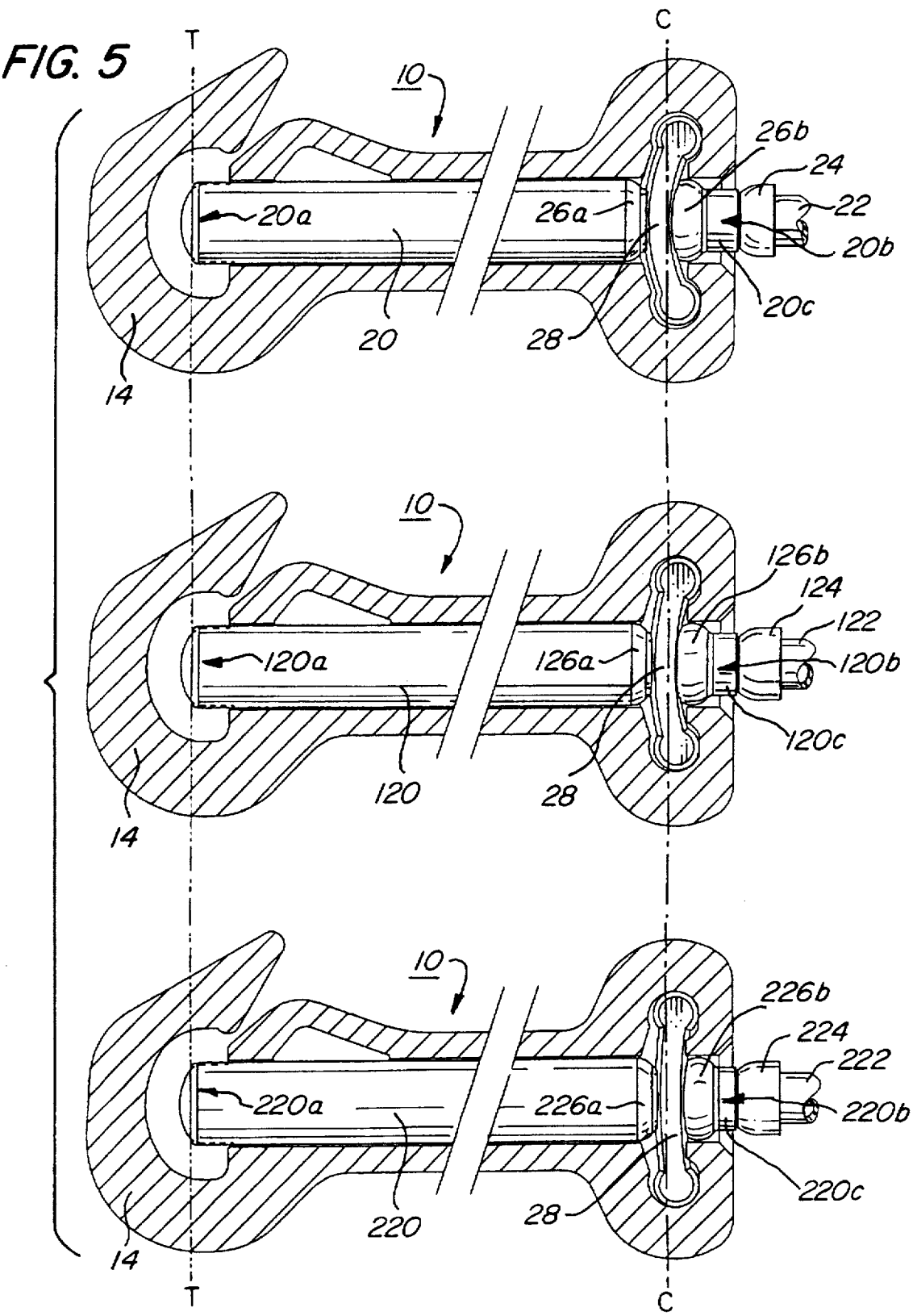

CONNECTOR BLOCK HAVING DETONATOR-POSITIONING LOCKING MEANS

CROSS REFERENCE TO RELATED APPLICATIONS

This application is a continuation-in-part of application Ser. No. 08/249,522 filed on May 26, 1994 in the name of Daniel P. Sutula, Jr. and entitled "Molded Article Having Integral Displaceable Member or Members and Method of Use", now U.S. Pat. No. 5,499,581, issued Mar. 19, 1996.

BACKGROUND OF THE INVENTION

1. Field Of The Invention

The present invention relates to connector blocks, the combination of connector blocks with detonators mounted therein, and to a method of mounting such detonators within the connector blocks to provide a combination of the type utilized to connect and initiate detonation signal transmission lines. More particularly, the present invention relates to and includes connector blocks including a locking member which, upon insertion into the connector block, serves both to accurately position and secure the detonator within the connector block.

2. Description Of Related Art

Connector blocks for blasting initiation systems are well-known in the art as exemplified by U.S. Pat. Nos. 5,171,935 and 5,398,611 of R. J. Michna et al, issued, respectively, on Dec. 15, 1992 and Mar. 21, 1995. Those patents disclose a connector block having a channel formed therein for receiving a low energy detonator, and an arcuate slot within which one or more signal transmission lines are retained in signal transmission juxtaposition with the detonator.

European Pat. Application 0 500 512 A2 of V. Lindqvist et al discloses a connector block for signal transmission lines which is of cylindrical configuration and, disclosed at column 11, lines 16–20 and illustrated in FIG. 6A, provides a detonator compartment having a head portion 69 formed with a hole 70 therein for insertion of a locking part, not shown in the drawing, which serves to prevent axial withdrawal of the detonator.

Connector devices which include tapered pins or other tapered locking members are shown in the prior art. For example, U.S. Pat. No. 3,349,706 to E. J. Schaumann, issued Oct. 31, 1967, shows a connector for positioning detonating fuse and a delay device in operative relationship to each other. This patent shows a body of thermoplastic material having a central tubular portion 1 and including tapered pins 4 integrally connected by a thin flexible web 5 to the main body as described at column 2, line 38 et seq. The thin connecting webs 5 are flexible enough to enable the pin to be rotated and inserted into an aperture provided for the purpose. Similar construction is shown in U.S. Pat. No. 4,424,747 of M. E. Yunan, issued Jan. 10, 1984. As described at column 6, line 26 et.seq, tapered pins 22 and 23 are integrally connected to sections 1B and 1C of the connector 1 by thin flexible webs of plastic 24 and 25, respectively.

SUMMARY OF THE INVENTION

Generally, the present invention provides a connector block having a channel formed therein for receiving and retaining a detonator and line-retaining means formed thereon for receiving and retaining one or more signal transmission lines in signal communication with the detonator. The connector block includes a locking member which is movable so that after insertion of a detonator into the channel, the locking member may be moved to its locking position in which it engages the detonator. The detonator may be axially misaligned, that is, it may be slightly out of axial position within the channel. If so, movement of the locking means to its locking position axially shifts the detonator within the channel to properly seat the detonator within the channel, as well as secure both the detonator and the locking member within the connector block.

Specifically, in accordance with the present invention there is provided a connector block for retaining at least one signal transmission line in signal transfer relationship with a detonator having an output end, the connector block comprising the following components. A body member has a signal transmission end, a locking end, and a longitudinally extending channel formed within the body member. The channel has therein a target location at which the output end of the detonator is to be positioned and is dimensioned and configured to receive such detonator therein for axial movement of the detonator within the channel from an axially misaligned position in which the output end is adjacent to but not at the target location, to a seated position in which the output end is at the target location. A line-retaining means is disposed at the signal transmission end of the body member for retaining therein such at least one signal transmission line in signal communication relationship with such output end of a detonator seated within the channel. A locking member is mountable within the connector block in a locking position in which the locking member and such detonator are secured within the connector block. The locking member is dimensioned and configured so that upon movement thereof towards its locking position the locking member engages such detonator within the channel and, if such detonator is in its axially misaligned position, axially moves such detonator into its seated position by movement of the locking member into its locking position.

Another aspect of the present invention provides that the body member further comprises a passageway formed therein for movement therethrough of the locking member to its locking position. In this aspect, the locking member is carried on the connector block in a first position in which the locking member is (i) aligned with the passageway for movement therethrough towards the channel, and (ii) displaced from its locking position to leave the channel open for insertion of such detonator into the channel.

In accordance with another aspect of the invention, the locking member is connected to the body member by deformable web means, e.g., frangible web means, which retain the locking member in the first position, the locking member being displaceable from its first position to its locking position by application of force to the locking member to deform, e.g., to rupture, the deformable web means and move the locking member through the passageway and force it into its locking position.

Yet another aspect of the present invention provides for the locking member to have first engagement means comprising at least one wedge-shaped surface, and the body member to have a passageway formed therein for movement therethrough of the locking member to its locking position. The wedge-shaped surface and the passageway are each dimensioned and configured whereby movement of the locking member along the passageway to its locking position causes the first engagement means to contact such detonator and, if such detonator is in its axially misaligned position, to impart to it a force component which axially moves such detonator into its seated position.

In accordance with yet another aspect of the invention, the locking member comprises a resilient member which is dimensioned and configured to be deformed by such detonator when the locking member is in its locking position and thereby to impose a reactive force on such detonator to urge such detonator into its seated position.

Another aspect of the present invention provides that the locking member comprises a resilient, bowed web section which has a convex surface facing towards the signal transmission end of the connector block and a concave surface facing towards the support land.

A major aspect of the present invention provides for a connector block as described above in combination with a detonator mounted therein. The detonator has an output end and is seated within the channel and a locking member is mounted on the connector block in a locking position, the locking member being dimensioned and configured to engage the detonator and urge it into, and maintain it in, its seated position.

Still another inventive aspect of the combination of the connector block and the detonator provides that the locking member has first engagement means, for example, at least one wedge-shaped surface, and the body member further comprises a passageway formed therein, e.g., located at the locking end of the body member and extending transversely of the channel, for movement therethrough of the locking member to its locking position. The first engagement means and the passageway are each dimensioned and configured whereby movement of the locking member along the passageway to its locking position causes the first engagement means to contact such detonator and, if such detonator was in its axially misaligned position, to impart to it a force component which axially moves such detonator into its seated position.

Another aspect of the invention provides that the detonator has second engagement means, e.g., a crimp, formed thereon and the locking member is in engagement with the second engagement means to secure the detonator within the channel.

A related aspect of the invention provides that the locking member comprises a resilient member which is deformed by its engagement with the detonator, e.g., with the crimp, and thereby exerts a reaction force against the detonator which reaction force urges the detonator into its seated position.

Another related aspect provides that the distance of the crimp relative to the output end of the detonator may vary over a manufacturing tolerance range and the resilient locking member has a range of deformation recovery which is at least as great as the manufacturing tolerance range.

A method aspect of the present invention provides a method of mounting within a connector block a detonator having thereon first engagement means, e.g., a crimp, the connector block being as described above and the method comprising the following steps. The detonator is inserted into the channel with the output end of the detonator facing the target location within the channel. The locking ember is moved into contact with the detonator and into its locking position and, if the detonator is in its axially misaligned position, it is moved to its seated position by action of the locking member thereon, e.g., by the locking member exerting force on the crimp. The first and second engagement means are placed into locking engagement with each other to thereby secure the detonator and the locking member within the connector block.

Another method aspect of the invention provides that the locking member comprises a resilient member and the method includes forcing the locking member against the detonator to thereby deform the locking member by the detonator when the locking member is in its locking position, thereby causing the locking member to react against the detonator to bias the detonator into its seated position.

Other aspects of the present invention will be apparent from the following description and the appended drawings.

BRIEF DESCRIPTION OF THE DRAWINGS

FIG. 1 is a perspective view of a connector block in accordance with one embodiment of the present invention with its locking member shown in its first position;

FIG. 2 is a side elevation view of the connector block of FIG. 1;

FIG. 2A is a schematic longitudinal section view, enlarged relative to FIG. 2, of the signal transmission end of the connector block of FIG. 2 and showing six signal transmission lines retained therein;

FIG. 3 is a perspective view, enlarged with respect to FIG. 1 and with parts broken away, of the connector block of FIG. 1;

FIG. 4 is a perspective view with parts broken away of the connector block of FIG. 1 with a detonator seated therein;

FIG. 4B is a top plan view, reduced relative to FIG. 4A, of the locking member of FIG. 4A;

FIG. 4C is a view with parts broken away of the end of the detonator channel at the signal transmission end of the connector block of FIG. 4;

FIG. 4D is a partial view of the detonator shown in FIG. 3 with the locking member of FIG. 4 being moved into engagement therewith;

FIG. 5 is a longitudinal section view of three connector blocks in accordance with an embodiment of the present invention, each connector block having a respective crimped detonator seated therein, the respective detonators demonstrating a range of locations of the crimp;

FIG. 7 is a schematic partial view showing a locking member imposing compressive force on the resilient bushing of a detonator in accordance with another embodiment of the present invention.

DETAILED DESCRIPTION OF THE INVENTION AND PREFERRED EMBODIMENTS THEREOF

Connector blocks of the type utilized in blast initiation systems have mounted therein a low energy detonator and have means thereon to receive and retain one or more signal transmission lines in signal transmission juxtaposition with the detonator. As is well-known, the detonator has its own signal transmission line crimped into it and an initiation signal is transmitted therethrough to initiate the detonator, which in turn initiates an outgoing signal in the one or more signal transmission lines retained by the connector block. These outgoing signal transmission lines may terminate in other detonators positioned at various locations to either initiate signals in still other signal transmission lines or to detonate main explosive charges into which the other detonators have been inserted.

One well-known form of construction is to provide a signal or low energy detonator within a connector block with a length of signal transmission tube crimped into the detonator and a high energy or so-called downhole detonator crimped at the opposite end of the length of signal transmission tube. These assemblies may be readily field-connected to other like assemblies or otherwise arranged to provide great flexibility in establishing blast initiation systems.

The signal transmission lines are typically signal transmission tubes comprising hollow plastic tubing, the inside surfaces of which are coated with reactive material such as a mixture of a high brisance explosive and aluminum powder in the case of shock tube or a deflagrating material in the case of low velocity signal transmission tube. Any suitable signal transmission line may be used in conjunction with the connector blocks of the present invention, such as shock tube, low velocity signal transmission tube or low energy detonating cord.

Figure 2B:
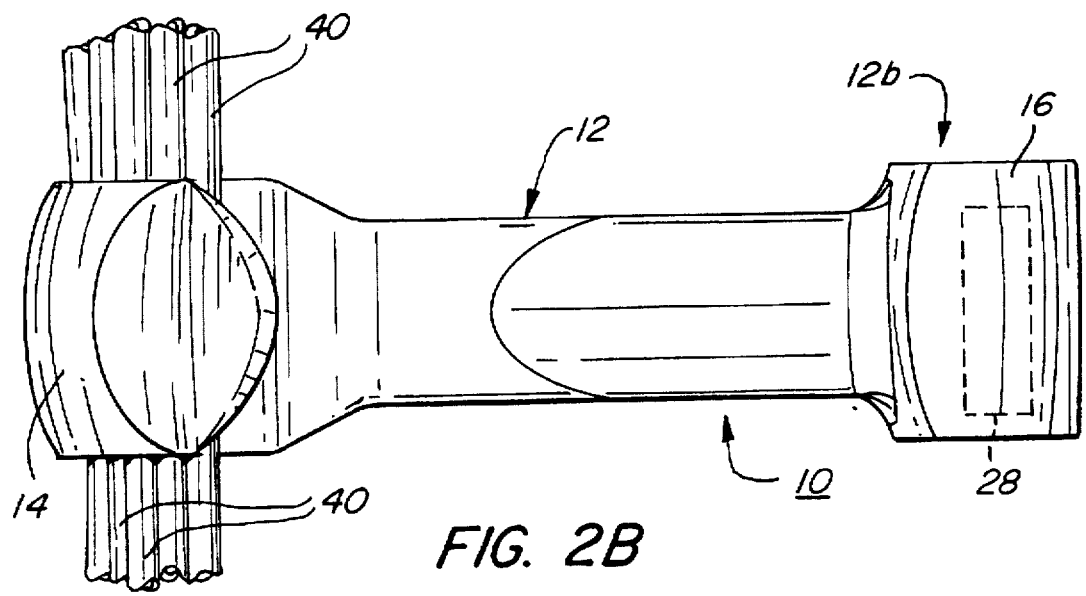
FIG. 2B is a top view of the connector block of FIG. 1 showing the six signal transmission lines of FIG. 2A broken away and the locking member in its locking position.

FIGS. 1 and 2 show a connector block 10 comprising an embodiment of the present invention and comprised of a body member 12 having a signal transmission end 12a, an opposite, locking end 12b, a line-retaining means 14 disposed at the signal transmission end 12a of body member 12, and a housing 16 at the locking end 12b of body member 12. A channel 18 (best seen in FIG. 3) extends through body member 12 and is dimensioned and configured to receive therein a mountable member comprising, in this case, a low energy or signal-transmitting detonator 20 (FIG. 4) having an output end 20a within which is disposed an explosive charge 21. Channel 18 is sized relative to detonator 20 so that detonator 20 can be readily inserted, output end 20a first, into channel 18 in the direction indicated by arrow I in FIG. 3, and slidably received therewithin. Such insertion may be accomplished either by hand or machine assembly. Channel 18 is, in the embodiment of FIGS. 1–4C, hexagonal in cross section but it could have any suitable cross-sectional shape, e.g., circular, as long as the detonator can be readily inserted and maintained within the channel. In any case, the channel 18 terminates at stop members 19a and 19b between which is an opening 18a (FIG. 4C) at the signal transmission end 12a of body member 12. Opening 18a serves to expose the one or more shock tubes 40 (FIGS. 2A and 2B) directly to the output end 20a (the explosive-containing end, as described below) of detonator 20. Stop members 19a and 19b serve to position detonator 20 within channel 18, detonator 20 being fully seated within channel 18 when output end 20a thereof is abutted against stop members 19a and 19b.

Detonator 20 is of conventional construction and comprises a cylindrical tube, which may be made of a metal such as aluminum or copper, or of a suitable plastic (a synthetic organic polymeric material). Detonator 20 has an output end 20a within which is received an explosive charge 21 (FIG. 4), typically about 1 to 3 grains (64.8 to 194.4 mg) of an explosive such as lead azide, preferably not more than 5 grains (324 mg) of such explosive. These are rather small explosive charges as compared to detonator caps conventionally used to detonate main explosive charges, which typically contain about 9.25 to 14.66 grains (600 to 950 mg) of explosive.

Detonator 20 would typically include a delay train of a suitable pyrotechnic material interposed between the explosive charge 21, and a signal transmission line 22 (FIG. 4) which is received within a resilient bushing 24 having an exposed end face 24a. A sealing crimp 26 is formed in the shell of detonator 20 and the end portion 20c thereof is also crimped, both at the location of bushing 24, to seal the interior of detonator 20 against the environment and to secure bushing 24 and signal transmission line 22 within detonator 20. Crimp 26 also provides a second engagement means on detonator 20, as discussed below. It will be appreciated that signal transmission line 22, which is broken away in FIG. 4, typically has a length of from about 2.4 to 61 meters (8 to 200 feet), and at its end opposite the end crimped into detonator 20, may be crimped into a high energy detonator (not shown) suitable for use in initiating detonation of a main explosive charge. This is the type of arrangement illustrated in U.S. Pat. NO. 3,987,732 of R. W. Spraggs et al, issued Oct. 26, 1976. Obviously, the connector block of the invention may also be used in any other suitable blast initiation system connection.

Figure 4A:
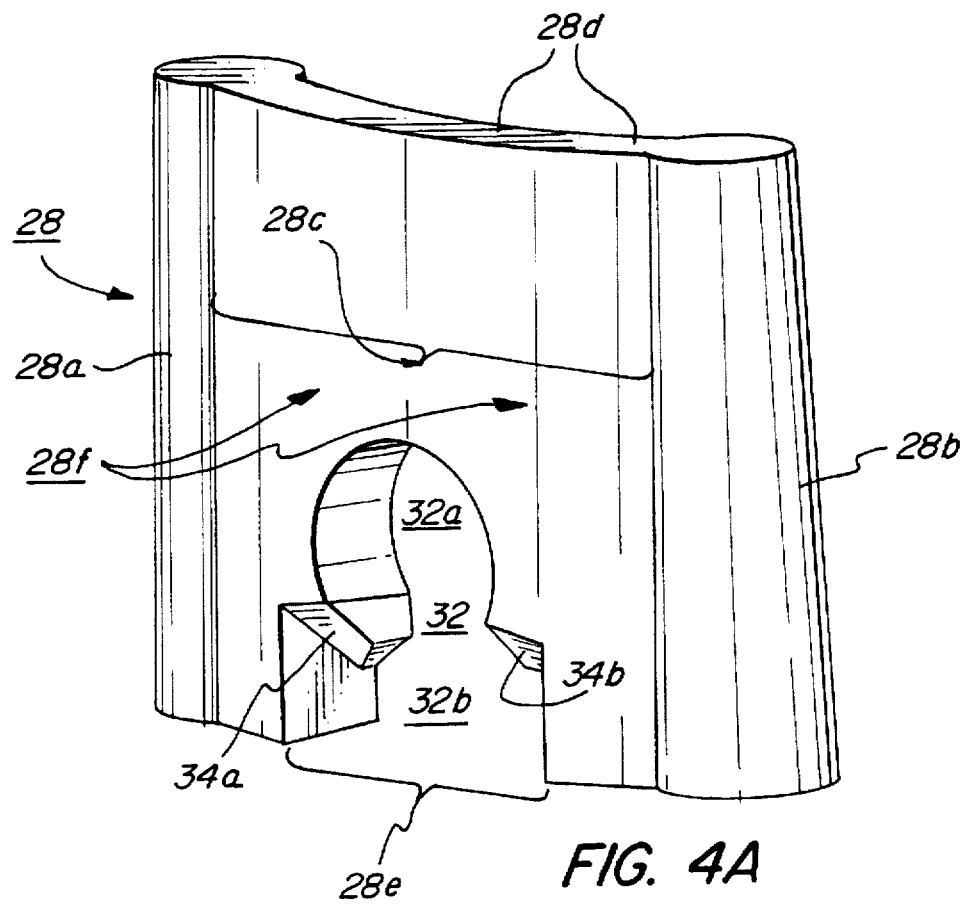
FIG. 4A is a perspective view, greatly enlarged relative to FIG. 1, of the locking member of the connector block of FIG. 1.
Figure 6:
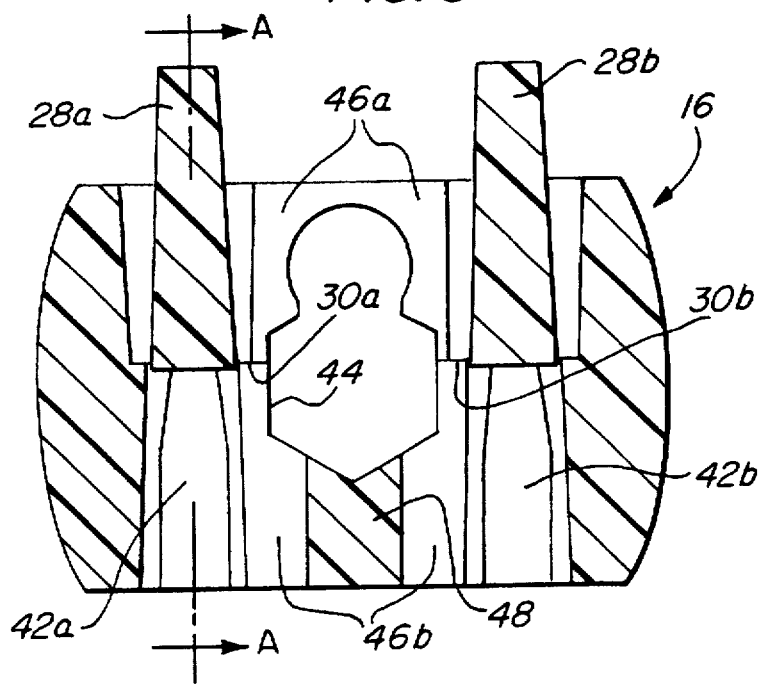
FIG. 6 is a section view, enlarged with respect to FIG. 2, taken along line 6—6 of FIG. 2.

A locking member 28 (FIGS. 1, 2 and 4A) is received within a passageway 36 (FIGS. 2, 3 and 4) which extends through housing 16 transversely of channel 18 and intersects the latter as best seen in FIG. 3. Locking member 28 is shown in FIGS. 1, 3 and 4 in its first position in which, in the illustrated embodiment, it protrudes outwardly of passageway 36 and housing 16. In its first position locking member 28 is aligned with passageway 36 for movement therethrough towards channel 18 but is displaced from its locking position in order to leave the channel 18 open for insertion of detonator 20 therein. In the illustrated embodiment, locking member 28 is integrally molded with the body member 12 and connected thereto by frangible webs 30a, 30b as seen in FIG. 6. That is, body member 12, frangible webs 30a, 30b and locking member 28 are all formed as a single, integral unit, e.g., by being injection-molded in a suitable mold. The frangible webs 30a, 30b form an integral connection between housing 16 and locking member 28. The use of deformable, e.g., frangible, webs to hold locking member 28 in its first position and initially provide connector block 10 as an integral, molded plastic unit is a preferred, but optional embodiment of the present invention and such construction is not essential to the practice thereof. Accordingly, locking means 28 may optionally be provided as an item separate from body member 12 or connected thereto by means other than a deformable web, e.g., by a thin, flexible tether. However, the advantages of providing the locking member integrally molded to the body member by a deformable, e.g., frangible, web or webs will be described below.

As best seen in FIGS. 4, 4B, 4D and 4E, locking member 28 is of generally plate-like configuration comprising a pair of side rails 28a, 28b of post-like configuration connected by a central, bowed, resilient web section 28c having a top edge 28d and a bottom edge 28e. Front surface 28f faces the opening 18a and stop members 19a, 19b of connector block 10 when locking member 28 is properly positioned relative to the connector block, e.g., is positioned within passageway 36. Locking member 28 is of bowed, resilient construction so that a force imposed on it in the direction of arrow f in FIG. 4B will, when locking member 28 is supported, e.g., within passageway 36, tend to deform locking member 28 into the more flattened configuration suggested by the dash lines in FIG. 4B. Locking member 28 is preferably made to be resilient enough to retain its elastic memory under such force and to exert an opposite, countervailing force against the force (arrow f in FIG. 4B) imposed upon it by detonator 20. Although retention of its resilient properties by locking member 28 under the force f is not essential, it is advantageous, as discussed below.

A central aperture 32 (FIGS. 4A and 4E) extends from bottom edge 28e, is positioned midway and symmetrically about a vertical centerline taken equidistant between side rails 28a and 28b and may extend from about one-third to one-half of the distance between bottom edge 28e and top edge 28d. Central aperture 32 is substantially keyhole-shaped, having an upper portion 32a which in end view comprises a circular arc and a generally rectangular lower portion 32b. A pair of wedge-shaped surfaces 34a, 34b protrude into lower portion 32b from respective opposite sides thereof. Wedge-shaped surfaces 34a, 34b slant rearwardly of locking member 28, i.e., they project from front surface 28f (FIGS. 4B and 4E) to rear surface 28g (FIG. 4B) of locking member 28. Surfaces 34a and 34b are dimensioned and configured to engage detonator 20 and position it within channel 18 as discussed below.

Generally, locking member 28 comprises a pair of spaced-apart leg members 28h, 28i (FIG. 4E) which define between them an aperture 32 and which leg members are dimensioned and configured to resiliently engage the detonator 20 when the locking member 28 is in its locking position. It will be appreciated that the locking member 28 may have any other suitable configuration which will engage detonator 20 and shift it into its seated position upon insertion of locking member 28 into its locking position to lock detonator 20 (and locking member 28) in place within the connector block 10.

Passageway 36 (FIGS. 2, 3 and 6) is shaped approximately congruently to locking member 28 so that the latter may move through passageway 36 in a sliding motion generally parallel to side rails 28a, 28b. Passageway 36 also provides a cavity within which locking member 28 is received and retained when it is moved to its locking position, as described below.

Line-retaining means 14 comprises a curved clip member having a proximal end 14b emanating from bottom side 12d at the signal transmission end 12a of body member 12 and curving upwardly and terminating in a distal end 14a adjacent top side 12c of body member 12. Line-retaining means 14 cooperates with body member 12 to define therebetween a line-retaining slot 15 which is of arcuate cross section as best seen in the side elevation views of FIGS. 2 and 2A. The distal end 14a of line-retaining means 14 cooperates with a raised formation 17 formed on top side 12c of body member 12, to define therebetween an entryway 38 (best seen in FIG. 2A) through which signal transmission lines, such as shock tubes 40, may be inserted sideways with a snap-motion into line-retaining slot 15 for retention therein, as is well-known in the art. The configuration of line-retaining means 14 may be of any suitable construction but that illustrated is an embodiment of an improved design thereof which is disclosed in co-pending patent application Ser. No. 08/549,160 of J. E. Fritz et al entitled "Connector Block For Blast Initiation Systems" filed Oct. 27, 1995. However, the connector block may have any suitable line-retaining means in accordance with the present invention.

A plurality of signal transmission lines comprising, in the illustrated embodiment, shock tubes 40 are shown (in cross section in FIG. 2A and broken away in FIG. 2B) received within arcuate line-retaining slot 15. One or a plurality of signal transmission tubes may be inserted into slot 15. In practice, the shock tubes 40 may extend from both sides of connector block 10 for greater or lesser distances, typically, from a few feet to many hundreds of feet or more. It will be noted that the arcuate configuration of slot 15 maintains each of the tubes 40 in close, signal transmission juxtaposition with the explosive charge 21 contained at the output end 20a of detonator 20.

In order to mount detonator 20 within connector block 10, detonator 20 is inserted, output end 20a first, into channel 18 through housing 16, as indicated by the arrow I in FIG. 3. As noted above, channel 18 is dimensioned and configured to readily slidably receive detonator 20 therein. The target location for the tip of output end 20a of detonator 20 is a location wherein output end 20a abuts against stop members 19a, 19b (FIG. 4C) at the end of channel 18. When so positioned, crimp 26 of detonator 20 will be aligned with central aperture 32 of locking member 28 when the latter is in its first position within passageway 36. Crimp 26 is bounded by tapered portions 26a, 26b thereof.

In practice, especially in automated or semi-automated high speed manufacturing procedures, two problems may be encountered at this point. One is that detonator 20 may be slightly axially misaligned within channel 18 so that output end 20a is close to, but is not in abutting contact with, stops 19a, 19b. Such axial misalignment may adversely affect the reliability of initiation of a signal in the shock tubes 40 retained within slot 15. The other difficulty is that slight manufacturing tolerance variations in the location of crimp 26 relative to output end 20a of detonator 20 and/or in the dimensions of connector block 10 may be encountered. (The crimp 26 may, and usually does, comprise the second engagement means of the detonator 20 which is to be engaged by the locking member 28.) The present invention addresses and overcomes both these problems simply upon movement of locking member 28 from its first position to its locking position. Thus, with reference to FIG. 4D, locking member 28 is shown at an early stage of its travel in the direction shown by arrow F through passageway 36 (not shown in FIG. 4D) from its first position in which locking member 28 is clear of channel 18 (not shown in FIG. 4D). An end portion 20c of detonator 20 extends between crimp 26 and the input end 20b of detonator 20. As locking member 28 is forced along passageway 36 in the direction indicated by arrow F in FIG. 4D, wedge-shaped surfaces 34a, 34b, (FIGS. 4A and 4D) engage the tapered portion 26a of crimp 26. Crimp 26 may be slightly axially misaligned with passageway 36, i.e., detonator 20 may not be properly seated in channel 18. This could occur due to a number of reasons including a failure to fully insert detonator 20 within channel 18, the existence of manufacturing tolerance defects such as crimp 26 not being precisely located where it should be on detonator 20, etc. In such case the movement of locking member 28 into engagement with detonator 20 will cause surfaces 34a and 34b to contact tapered portion 26a of crimp 26 and thereby force detonator 20 to shift in the direction of arrow D (FIGS. 4 and 4D) and thereby seat detonator 20 firmly against stops 19a, 19b within channel 18, thereby positioning output end 20a at its target location.

Figure 4E:
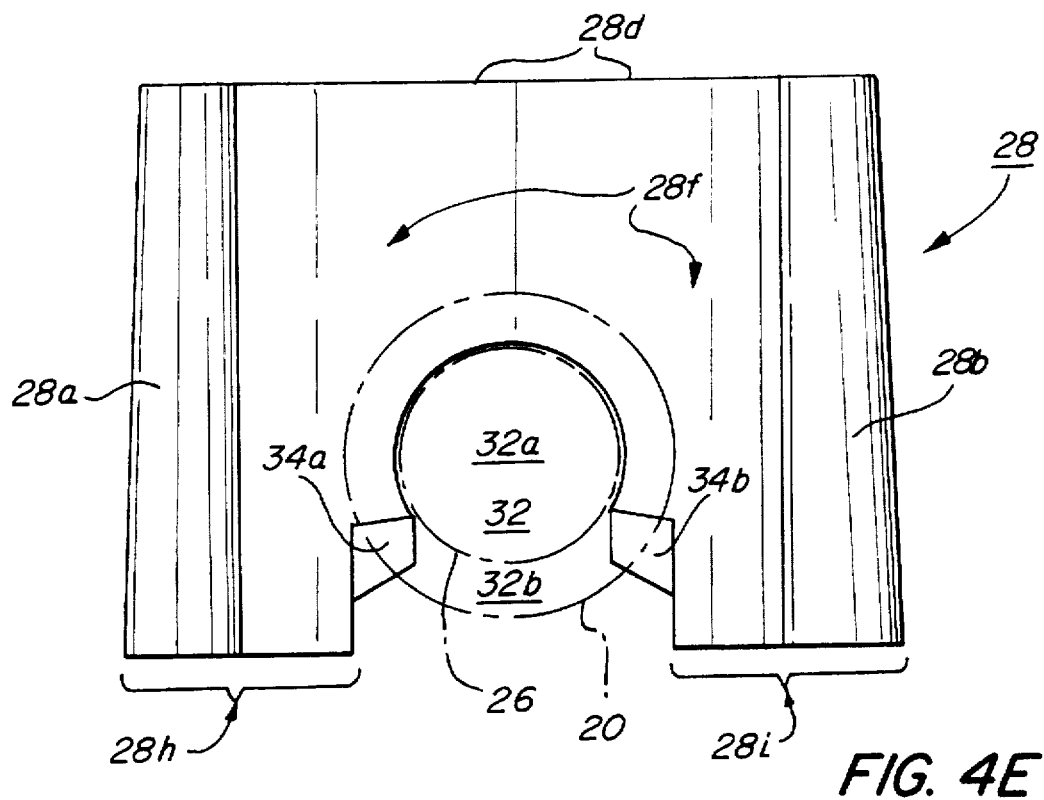
FIG. 4E is a front elevation view of the locking member of FIG. 4B with the periphery of the detonator with which the locking member is engaged being shown in phantom outline.

The spaced-apart leg members 28h, 28i and aperture 32 are dimensioned and configured so that leg members 28h, 28i are spread apart when the protrusions on which sur-faces 34a, 34b are formed engage crimp 26 and then snap together as upper portion 32a of aperture 32 engages the crimp 26 of detonator 20. The relative position of locking member 28 and the outer periphery of detonator 20 and its crimp 26 are shown in FIG. 4E wherein the peripheries of detonator 20 and crimp 26 are shown in phantom outline.

As seen in FIG. 2B, when locking member 28, which is shown in phantom outline, is in its locking position, it is entirely contained within passageway 36 and housing 16. Housing 16 thus serves to protect locking member 28 against being damaged or dislodged, as by being stepped on, once it is in its locking position. With detonator 20 and locking member 28 thus secured to each other with crimp 26 engaged by the upper portion 32a of aperture 32, locking member 28 and detonator 20 are both secured within connector block 10 with locking member 28 at least partly, and preferably fully, retained within and supported by the passageway 36. The interference fit of aperture 32 of locking member 28 relative to the outer periphery of detonator 20, as illustrated in FIG. 4E, enables locking member 28 to resist withdrawal of detonator 20 from connector block 10. As seen in FIG. 2B, the locking member 28 is fully retained within the passageway 36 when in its locking position.

Figure 6A:
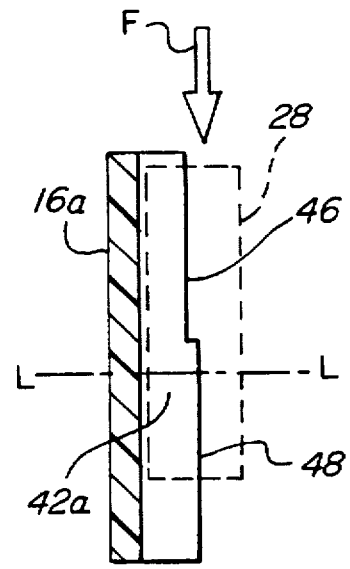
FIG. 6A is a section view taken along line A—A of FIG. 6.

FIGS. 6 and 6A show section views of passageway 36, which is configured to have a pair of spaced-apart grooves 42a, 42b within which side rails 28a, 28b of locking member 28 are received for sliding motion therethrough. (The remainder of locking member 28 is cut away by the section view of FIG. 6.) A hexagonal-shaped opening 44 is formed in housing 16 for passage of detonator 20 there-through and into channel 18 (FIG. 3). (The unnumbered circular opening above hexagonal opening 44 in FIG. 6 is formed by the mold fixture used to form the upper portion 32a of central aperture 32 of locking member 28 in the integrally molded illustrated embodiment.)

Between grooves 42a and 42b is formed a support land which protrudes into passageway 36 and comprises a backing land 46a and a stabilizing land 46b, the latter being divided by a support spar 48 which reinforces the outside wall 16a (FIGS. 2, 2A and 6A) of housing 16 by connecting it to body member 12. When locking member 28 (shown in phantom outline in FIG. 6A) is pushed through passageway 36 (in the direction of arrow F in FIG. 6A) frangible webs 30a, 30b rupture and grooves 42a, 42b guide side rails 28a, 28b as locking member 28 moves into its locking position. Once in its locking position (shown in phantom outline in FIG. 6A) the engagement of locking member 28 with detonator 20 (as indicated in FIG. 4E) locks both locking member 28 and detonator 20 in place within connector block 10.

In the field it often happens that tensile forces are imposed on signal transmission line 22 in the direction indicated by the arrow T in FIG. 4, as signal transmission line 22 is tugged and extended to other locations in the blasting site for connection, etc. Backing land 46a and stabilizing land 46b support the web section 28c of locking member 28 in resisting forces T imposed on detonator 20, thereby reinforcing web 28c against permanent deformation by such forces. As web 28c is preferably strong and resilient enough to retain its elastic memory, even if the tugging on signal transmission line 22 is strong enough to pull detonator 20 away from stop members 19a, 19b (FIG. 4C) by temporarily flattening web 28c, the elasticity of locking member 28 will force detonator 20 back to its sealed position with output end 20a thereof sealed against stop members 19a, 19b once the tugging force is released or at least diminished to a level less than the countervailing force imposed on detonator 20 by locking member 28. It is important to seat detonator 20 against stop members 19a, 19b because the typical use of low energy output detonators in connector blocks requires proper, close-up positioning of the output end 20a of the detonator relative to the retained signal transmission lines (40 in FIGS. 2A and 2B) in order to insure reliable initiation of the lines 40. Stabilizing land 46b, which is slightly deeper than backing land 46a, so that it projects outwardly therefrom as seen in FIG. 6A, extends above (as viewed in FIG. 6A) the longitudinal center axis L—L of channel 18, i.e., the vertical mid-point thereof, and therefore helps to stabilize locking member 28 against a tilting or rocking motion imposed by tugging on signal transmission line 22 and detonator 20.

FIG. 5 shows in schematic view three identical connector blocks 10 each having fully seated therein a respective detonator 20, 120, 220. The three connector blocks are identical as are the three detonators except for the location of the respective crimps on the detonators. Differences in the crimp location are exaggerated in FIG. 5 for clarity of illustration. The three detonators are respectively shown aligned with plane T—T passing along the inside face of stops 19a (and of stops 19b, not visible in FIG. 5) at the target location for respective output ends 20a, 120a, 220a. The center of the respective crimps (only the tapered portions 26a, 26b; 126a, 126b and 226a, 226b of which are visible in FIG. 5) are at respective different locations on the respective detonators. This is indicated by the plane C—C in FIG. 5 which shows the desired or target location of the longitudinal center of each crimp. The crimp of detonator 20, although within the manufacturing tolerance for its location, is closer to output end 20a of detonator 20 than the crimp of detonator 120, which is at exactly the manufacturing specification location, is to output end 120a of detonator 120. On the other hand, the crimp of detonator 220 is farther away from its output end 220a than is the crimp of detonator 120. The different relative positions of the crimps of the respective detonators 20, 120 and 220 may be appreciated by noting the different lengths (measured along the longitudinal axes of the detonators) of crimped end portions 20c, 120c and 220c. Provided only that the differences in relative location of the crimps are within a reasonable manufacturing tolerance and the detonator is reasonably close to its seated position within channel 18, locking member 28, by virtue of the sloped construction of surfaces 34a, 34b thereof (FIGS. 4A, 4D and 4E), will automatically slide the detonator from its axially misaligned position (in which output ends 20a, 120a and 220a are not abutting stop members 19a, 19b) into its seated position in which output ends 20a, 120a, 220a abut their respective stop members 19a, 19b. It will be noted from FIG. 5 that locking member 28 is flattened as illustrated in dash lines in FIG. 4B, to a greater or lesser degree, depending on the location of the crimp, by its engagement with the crimp of the detonator. The resiliency and bowed construction of locking member 28, with the convex front surface 28f thereof facing opening 18a (FIG. 4C) of channel 18, is such that, when it is flattened by its engagement with detonator 20, locking member 28 imparts a reaction force against the detonator 20 to urge the detonator against stop members 19a, 19b. Passageway 36 and lands 46a and 46b thereof support locking member 28 and enable it to exert a countervailing force on detonator 20.

In the travel of locking member 28 within passageway 36, passageway 36 provides a guide means to guide locking member 28 into place without need to turn or tip locking member 28, or otherwise cause it to deviate from its straight line travel. Generally, the location of the crimp relative to the output end 20a (or 120a or 220a) of the detonator varies over a manufacturing tolerance range, and the locking member 28 is designed to have a range of deformation recovery which is at least about ninety percent as great as, preferably at least as great as, the manufacturing tolerance range.

It will be appreciated that by integrally molding member 28 as part of connector block 10, member 28 is perfectly aligned with passageway 36, and assembly of locking member 28 into locking engagement with detonator 20 is greatly facilitated as compared to a situation in which the locking member is a separate piece. If locking member 28 were a separate piece it would require the manipulation of a rather small piece which, if made of a plastic material such as medium or high density polyethylene or some other suitable synthetic organic polymeric material, would be somewhat slippery and difficult to handle. (Medium or high density polyethylene or other polyolefin are preferred materials for the connector block 10 including locking member 28.) The small, separate locking member 28 would have to be properly positioned and aligned with passageway 36 and inserted therein to apply a force thereto as indicated by the arrow F in FIG. 4D. These difficulties are avoided by the integral molding of member 28 as part of connector block 10, the frangible webs 30a, 30b perfectly aligning and holding locking member 28 in place relative to passageway 36 until sufficient force is applied to rupture frangible webs 30a, 30b and force the locking member 28 from its first position through passageway 36 to its locking position.

Although the crimp 26 on detonator 20 (FIGS. 1 and 2) provides a convenient second engagement means for engagement by member 28, it is not necessary to use the crimp as the second engagement means to be engaged by the first engagement means of locking member 28. However, the conventional sealing crimp 26 provides a convenient second engagement means and does not require special construction of detonator 20.

Nonetheless, in an alternate construction in accordance with the present invention, the housing 16 of connector block 10 could be designed to have locking member 28 engage a second crimp or other formation formed on detonator 20 or engage the end face 24a of bushing 24, instead of crimp 26. For example, the locking member 28 could have formed therein a slot or aperture to engage or accommodate signal transmission line 22, and be designed to abut end face 24a of bushing 24 to retain detonator 20 in place.

FIG. 7 shows a locking member 28' having an aperture 32' formed therein and extending from the bottom 28a' of locking member 28' along the centerline thereof. Locking member 28' is shown in its locking position wherein signal transmission line 22 is engaged by aperture 32' and locking member 28' abuts end face 24a and is positioned to compress bushing 24, which is retained in place by crimp 26. Locking member 28' thereby places detonator 20 under a compressible load. As the bushing 24 is a resilient, elastomeric material, the compressive load or force imposed on its end face 24a and directed towards the detonator 20 will cause the compressed bushing 24 to act as a spring, imposing a force on detonator 20 in the direction of the unnumbered arrow in FIG. 7 (i.e., in the direction of arrows D in FIGS. 4 and 4D). This force will keep detonator 20 seated within channel 18 (FIGS. 3 and 4) and resist forces, such as the force indicated by the arrow T in FIG. 4, imposed on detonator 20.

In the embodiment of FIG. 7, locking member 28' may be of resilient, bowed construction like locking member 28 of FIGS. 4A and 4B, in which case the compressive forces acting upon detonator 20 (FIG. 7) will be the combined spring forces of compressed bushing 24 and locking member 28'. Alternatively, locking member 28' may be of rigid and/or planar construction with the compressive force acting on detonator 20 being supplied solely by the compression of bushing 24. In the embodiment of FIG. 7, the exposed end face 24a of resilient bushing 24 serves as the second engagement means formed on the detonator.

The connector blocks of the present invention are well suited for assembly line production. Thus, an operator can insert a suitable detonator 20 into the channel 18, the stop members 19a, 19b at the discharge end of channel 18 providing a stop which will properly seat the detonator 20 with its crimp 26 aligned with the passageway 36 and web section 28c. With the detonator held in place, a foot pedal or other suitable device can be actuated by the operator or an automatic device can be used to actuate a punch which will apply the force indicated by the arrows F in FIGS. 4D and 6A to a locking member 28 to rupture the frangible webs 30a, 30b and drive the locking member 28 through its passageway 36 and into its locking position, wherein it engages and locks the detonator. Alternatively, the locking member may be actuated in the field to assemble a suitable detonator into the connector block on-site.

It will be appreciated that the locking member 28 may have any other suitable configuration which will engage detonator 20 and shift it into its seated position upon insertion into channel 18 to lock detonator 20 in place. For example, instead of the bifurcate construction illustrated, in FIGS. 4A and 4E, the locking member may be wedge-shaped or any other suitable configuration. However, the illustrated bifurcate construction is preferred because of the positive locking engagement it provides between locking member 28 and crimped detonator 20. It will be noted that upper portion 32a of aperture 32 has an open portion between the protrusions on which surfaces 34a and 34b are formed of less than 180 degrees, so that the protrusions formed at the intersection of upper portion 32a and lower portion 32b must flex outwardly as locking member 28 is forced over the crimp 26 of detonator 20, and the protrusions snap back into place as they pass over the diameter, i.e., center of crimp 26. In this manner, locking member 28 is forced into an over-center, snap-fit engagement with crimp 26 of detonator 20, so that locking member 28 is thereby seated within passageway 36 and it and detonator 20 are firmly locked in position within connector block 10.

While the invention has been described with reference to a particular preferred embodiment thereof, it will be apparent to those skilled in the art upon a reading and understanding of the foregoing that numerous connector block designs other than the specific embodiment illustrated are attainable which nonetheless lie within the spirit and scope of the present invention. It is intended to include all such other designs and substantial equivalents thereof within the scope of the appended claims.

What is claimed is:

1. A connector block for retaining at least one signal transmission line in signal transfer relationship with a detonator having an output end and second engagement means, the connector block comprising:

a body member having a signal transmission end, a locking end, and a longitudinally extending channel formed within the body member and having a longitudinal axis, the channel having therein, adjacent the signal transmission end of the body member, a target location at which the output end of the detonator is to be positioned and being dimensioned and configured to receive such detonator therein for axial movement of the detonator within the channel from an axially misaligned position in which the output end is adjacent to, but not at, the target location to a seated position in which the output end is at the target location;

a line-retaining means disposed at the signal transmission end of the body member for retaining therein such at least one signal transmission line in signal communication relationship with such output end of a detonator seated within the channel; and a locking member which is mountable within the connector block in a locking position in which the locking member and such detonator are secured within the connector block, the locking member having thereon first engagement means comprising at least one wedge-shaped surface and being otherwise dimensioned and configured so that upon movement of the locking means towards its locking position the wedge-shaped surface engages the second engagement means of such detonator within the channel, the wedge-shaped surface facing generally longitudinally along the channel and being slanted non-perpendicularly relative to the longitudinal axis of the channel whereby if such detonator is in its axially misaligned position, the locking member axially moves such detonator into its seated position by movement of the locking member into its locking position.

2. The connector block of claim 1 wherein the body member further comprises a passageway formed therein for movement therethrough of the locking member to its locking position, and the locking member is carried on the connector block in a first position in which the locking member is (i) aligned with the passageway for movement therethrough towards the channel and (ii) displaced from its locking position to leave the channel open for insertion of such detonator into the channel.

3. The connector block of claim 2 wherein the locking member is connected to the body member by deformable web means which retain the locking member in the first position, the locking member being displaceable from its first position to its locking position by application of force to the locking member to deform the deformable web means and move the locking member through the passageway and force it into its locking position.

4. A connector block for retaining at least one signal transmission line in signal transfer relationship with a detonator having an output end, the connector block comprising:

a body member having a signal transmission end, a locking end, and a longitudinally extending channel formed within the body member, the channel having therein a target location at which the output end of the detonator is to be positioned and being dimensioned and configured to receive such detonator therein for axial movement of the detonator within the channel from an axially misaligned position in which the output end is adjacent to, but not at, the target location to a seated position in which the output end is at the target location;

a line-retaining means disposed at the signal transmission end of the body member for retaining therein such at least one signal transmission line in signal communication relationship with such output end of a detonator seated within the channel; and a locking member which is mountable within the connector block in a locking position in which the locking member and such detonator are secured within the connector block, the locking member being connected to the body member by frangible web means which retain the locking member in the first position, the locking member being displaceable from its first position to its locking position by application of force to the locking member to rupture the frangible web means and move the locking member through the passageway and force it into its locking position, and the locking member further being dimensioned and configured so that upon movement thereof towards its locking position the locking member engages such detonator within the channel and, if such detonator is in its axially misaligned position, axially moves such detonator into its seated position by movement of the locking member into its locking position.

5. The connector block of claim 3 or claim 4 wherein the locking member is at least partly retained within the passageway when in its locking position.

6. The connector block of claim 3 or claim 4 wherein the locking member is dimensioned and configured to be fully contained within, and not to protrude beyond, the passageway when the locking member is in its locking position.

7. The connector block of claim 1 wherein the locking member has first engagement means formed thereon and the body member further comprises a passageway formed therein for movement therethrough of the locking member to its locking position, the first engagement means and the passageway each being dimensioned and configured whereby movement of the locking member along the passageway to its locking position causes the first engagement means to contact such detonator and, if such detonator is in an axially misaligned position, to impart to it a force component which axially moves such detonator into its seated position.

8. The connector block of claim 1 wherein the locking member comprises a resilient member which is dimensioned and configured to be deformed by such detonator when the locking member is in its locking position and thereby to impose a reactive force on such detonator to urge such detonator into its seated position.

9. The connector block of claim 8 wherein the resilient member comprises a web means having one or more wedge-shaped surfaces thereon which surfaces are dimensioned and configured to engage such detonator.

10. The connector block of claim 8 or claim 9 wherein the body member further comprises a passageway formed therein for movement therethrough of the locking member to its locking position and the passageway comprises a support land formed therein which is dimensioned and configured to support the locking member against forces imposed upon it by such detonator.

11. A connector block for retaining at least one signal transmission line in signal transfer relationship with a detonator having an output end, the connector block comprising:

a body member having a signal transmission end, a locking end, and a longitudinally extending channel formed within the body member, the channel having therein, adjacent the signal transmission end of the body member a target location at which the output end of the detonator is to be positioned and being dimensioned and configured to receive such detonator therein for axial movement of the detonator within the channel from an axially misaligned position in which the output end is adjacent to, but not at, the target location to a seated position in which the output end is at the target location;

a line-retaining means disposed at the signal transmission end of the body member for retaining therein such at least one signal transmission line in signal communication relationship with such output end of a detonator seated within the channel; and a locking member comprising a resilient, bowed web section which has a convex surface facing towards the signal transmission end of the body member and a concave surface facing towards the locking end of the body member, the locking member being mountable within the connector block in a locking position in which the locking member and such detonator are secured within the connector block, the locking member being dimensioned and configured so that upon movement thereof towards its locking position the locking member engages such detonator within the channel and, if such detonator is in its axially misaligned position, axially moves such detonator into its seated position by movement of the locking member into its locking position.

12. A connector block in combination with a detonator mounted therein, the connector block being dimensioned and configured to retain at least one signal transmission line in signal transfer relationship with the detonator, the combination being comprised of:

the connector block comprising a body member having a signal transmission end, a locking end, and a longitudinally extending channel formed within the body member, the channel having therein, adjacent the signal transmission end of the body member, a target location at which the output end of the detonator is to be positioned and being dimensioned and configured to receive the detonator therein for axial movement of the detonator within the channel (i) from an axially misaligned position in which the output end is adjacent to, but not at, the target location, (ii) to a seated position in which the output end is at the target location;

the detonator having an output end and being seated within the channel;

a line-retaining means disposed at the signal transmission end of the body member for retaining therein such at least one signal transmission line in signal communication relationship with the output end of the detonator; and a locking member mounted within the connector block in a locking position, the locking member comprising a resilient, bowed web section which has a convex surface facing towards the signal transmission end of the body member and a concave surface facing towards the locking end of the body member, the locking member being dimensioned and configured whereby, (1) if the detonator is in its axially misaligned position to move the detonator to its seated position upon movement of the locking member to its locking position, and (2) to engage the detonator and maintain it in its seated position when the locking member is in its locking position.

13. The connector block of claim 1, claim 11 or claim 12 wherein the output end of the detonator is short of the target location when the detonator is in its axially misaligned position, the connector block further comprising one or more stop members disposed at the target location of the channel, and wherein the locking member is dimensioned and configured whereby the movement of the locking member into its locking position axially moves such detonator, when in its axially misaligned position, towards the output end of the connector block.

14. The connector block of claim 12 wherein the locking member has first engagement means thereon and the body member further comprises a passageway formed therein for movement therethrough of the locking member to its locking position, the first engagement means and the passageway each being dimensioned and configured whereby movement of the locking member along the passageway to its locking position caused the first engagement means to contact the detonator and, if the detonator were at the time of such movement of the locking member in its axially misaligned position, to impart to the detonator a force component which axially moved the detonator into its seated position.

15. The connector block of claim 14 wherein the first engagement means comprises at least one wedge-shaped surface.

16. The connector block of claim 2 or claim 14 wherein the passageway extends transversely of the channel and is located at the locking end of the body member.

17. The connector block of claim 1 or claim 14 wherein the locking member comprises a pair of spaced-apart leg members which define between them an aperture and which are dimensioned and configured to resiliently engage such detonator when the locking member is in its locking position.

18. The connector block of claim 17 wherein the locking member has thereon first engagement means comprising a pair of wedge-shaped surfaces one disposed on either side of the aperture and the wedge-shaped surfaces are dimensioned and configured to engage such detonator within the channel.

19. The connector block of claim 14 wherein the detonator has second engagement means formed thereon and the locking member is in engagement with the second engagement means to secure the detonator within the channel.

20. The connector block of claim 19 wherein the second engagement means comprises a crimp in the detonator.

21. The connector block of claim 19 wherein the detonator has an input end closed by a resilient bushing having an exposed end face and the second engagement means comprises the end face of the bushing.

22. The connector block of claim 20 wherein the locking member comprises a resilient member which is deformed by its engagement with the crimp in the detonator and thereby imposes a reactive force on the detonator to urge the detonator into its seated position.

23. The connector block of claim 22 wherein the distance of the crimp relative to the output end of the detonator varies over a manufacturing tolerance range and the locking member has a range of deformation recovery which is at least about ninety percent of the manufacturing tolerance range.

24. The connector block of claim 20 or claim 22 wherein the body member further comprises a passageway formed therein for movement therethrough of the locking member to its locking position, and the locking member is at least partly retained within and supported by the passageway when in its locking position.

25. The connector block of claim 24 wherein the locking member comprises a pair of spaced-apart leg members which define between them an aperture and which are dimensioned and configured to resiliently engage the crimp of the detonator.

26. The connector block of claim 20 wherein the body member further comprises a passageway formed therein for movement therethrough of the locking member to its locking position and the passageway comprises a support land formed therein which is dimensioned and configured to support the locking member against forces imposed upon it by such detonator.

27. A method of mounting within a connector block a detonator having thereon second engagement means, the connector block comprising a body member having a signal transmission end, a locking end, and a longitudinally extending channel formed within the body member and having a longitudinal axis, the channel extending between the signal transmission end and the locking end, the channel having therein, adjacent the signal transmission end of the body member, a target location at which the output end of the detonator is to be positioned and being dimensioned and configured to receive such detonator therein for axial movement of the detonator within the channel (i) from an axially misaligned position in which the output end is adjacent to, but not at, the target location, (ii) to a seated position in which the output end is at the target location the connector block further comprising a locking member on which first engagement means comprising at least one wedge-shaped surface are formed, the wedge-shaped surface facing generally longitudinally along the channel and being slanted non-perpendicularly relative to the longitudinal axis of the channel whereby, if the detonator is in its actually misaligned position, the locking member axially moves the detonator into its seated position by movement of the locking member into its locking position, the connector block further comprising a line-retaining means disposed at the signal transmission end of the body member for retaining therein at least one signal transmission line in signal communication relationship with the output end of such detonator seated within the channel; the method comprising:

inserting the detonator into the channel to position the output end of the detonator at or adjacent to the target location within the channel;

moving the locking member to bring the wedge-shaped surface of the first engagement means thereof into contact with the second engagement means of the detonator while moving the locking member into its locking position and, if the detonator is in its axially misaligned position, axially moving the detonator to its seated position by action of the first engagement means of the locking member on such detonator, and engaging the first and second engagement means in locking engagement with each other to thereby secure the detonator and the locking member within the connector block.

28. The method of claim 27 wherein the second engagement means comprises a crimp in the detonator and the locking member is dimensioned and configured to contact the crimp of the detonator and to axially move the detonator by exerting force on the crimp.

29. The method of claim 27 or 28 including moving the locking member transversely of the direction of axial movement of the detonator.

30. The method of claim 27 or claim 28 wherein the locking member comprises a resilient member and the method includes forcing the locking member against the detonator to thereby deform the locking member by the detonator when the locking member is in its locking position, thereby causing the locking member to impose a reactive force against the detonator to urge the detonator into its seated position.

31. The method of claim 30 wherein the distance of the crimp relative to the output end of the detonator varies over a manufacturing tolerance range, and the locking member has a range of deformation recovery which is at least about ninety-percent of the manufacturing tolerance range.

32. The method of claim 30 wherein the body member further comprises a passageway formed therein for movement therethrough of the locking member to its locking position and the passageway comprises a support land and the method further comprising supporting the deformed locking member against the deformation forces imposed on it by the detonator.

33. The method of claim 27 wherein the output end of the detonator is short of the target location when the detonator is in its axially misaligned position, the connector block further comprises one or more stop members disposed at the target location of the channel, and wherein the wedge-shaped surface faces the stop members and is slanted relative to the longitudinal axis of the channel whereby, upon moving the locking member into its locking position, the locking member axially moves such detonator, when in its axially misaligned position, towards the output end of the connector block.

* * * * *